United States Patent [19]
AuYeung

[11] Patent Number: 5,325,216
[45] Date of Patent: Jun. 28, 1994

[54] RASTER OUTPUT SCANNER WITH SUBPIXEL ADDRESSABILITY

[75] Inventor: Vincent W. AuYeung, Temple City, Calif.

[73] Assignee: Xerox Corporation, Stamford, Conn.

[21] Appl. No.: 812,295

[22] Filed: Dec. 23, 1991

[51] Int. Cl.$^5$ .................................................. H04N 1/23
[52] U.S. Cl. .................................... 358/479; 358/296; 358/302; 346/160
[58] Field of Search ............... 358/401, 479, 481, 501, 358/502, 302, 298, 300, 296; 346/108, 160; H04N 1/23

[56] References Cited

U.S. PATENT DOCUMENTS

| | | | |
|---|---|---|---|
| 4,390,882 | 6/1983 | Ohara et al. | 346/1.1 |
| 4,626,923 | 12/1986 | Yoshida | 353/283 |
| 4,661,859 | 4/1987 | Mailloux et al. | 358/283 |
| 4,884,149 | 11/1989 | Shoji et al. | 346/108 |
| 4,905,023 | 2/1990 | Suzuki | 358/298 |
| 5,041,848 | 8/1991 | Gilbert et al. | 346/108 |
| 5,184,226 | 2/1993 | Cianciosi | 358/300 |
| 5,218,378 | 6/1993 | Tisue | 358/298 |

FOREIGN PATENT DOCUMENTS 361538  4/1990  European Pat. Off.  ..... H04N 1/411

Primary Examiner—Reinhard J. Eisenzopf
Assistant Examiner—Jill Jackson
Attorney, Agent, or Firm—Fariba Rad

[57] ABSTRACT

A raster output scanner interface apparatus for receiving subpixel address data and pixel video data that are synchronized with a raster output scanner on a pixel basis, and for sending video output to the raster output scanner that is synchronized with the raster output scanner on a pixel basis. The apparatus provides a programmable switch that receives as inputs both the pixel video data and the pixel video data delayed a programmable amount by a programmable delay buffer. The output of the switch is the video output that is sent to the raster output scanner. The amount of delay of the programmable buffer is programmed by a controller in response to the subpixel address data. The controller also controls the switch in response to the subpixel address data and the pixel video data.

4 Claims, 3 Drawing Sheets

RASTER OUTPUT SCANNER WITH SUBPIXEL ADDRESSABILITY

BACKGROUND AND INFORMATION DISCLOSURE STATEMENT

This invention relates to a raster output scanner interface, and more particularly to an interface providing subpixel spot size and addressability.

In a typical raster output scanner (ROS), a light source, such as a laser diode or a helium-neon laser, emits a light beam that is modulated according to a video signal. The light beam is directed through conditioning optics onto the reflective facets of a rotating polygon. The polygon, typically rotating at a rate in the 3 to 23 thousand revolutions per minute range, then scans the beam through more conditioning optics and images the laser spot across the full process width of a photosensitive image plane, in the fast scan direction. Meanwhile, the image plane moves in the slow scan direction, approximately parallel to the fast scan direction, in synchronization with the ROS so that successive passes of the laser spot across the width of the image plane produce successive scan lines.

On the image plane there are imaged various primitives, including dots, lines and arcs, that constitute text characters and graphics. An important portion of the primitives are edges. Irregularities in edges between successive scan lines are readily perceived.

One technique to smooth edges is to simply image the primitives at a finer resolution. To achieve finer resolution (e.g., 600 spi), the ROS would need to be redesigned to increase the input data rate to accept the data needed to define the higher resolution. To image the increased data rate would require either increasing the speed of rotation of the polygon or the number of polygon facets, or some combination of these two approaches.

In general, the above approaches have proven adequate. These approaches, however, suffer the drawback of increased complexity and cost. Moreover, for high speed imaging (e.g., 120 ppm), the system clock rate needed to input and process the necessary image data becomes prohibitively fast, requiring expensive components to respond to the system clock, as well as careful layout to avoid noise problems and electromagnetic interference.

SUMMARY OF THE INVENTION

The present invention is directed to a raster output scanner interface apparatus for receiving subpixel address data and pixel video data that are synchronized with a raster output scanner on a pixel basis, and for sending video output to the raster output scanner that is synchronized with the raster output scanner on a pixel basis. The apparatus includes means for receiving the pixel video data and delaying the pixel video data a programmable amount. Means operably connected to the pixel video data delaying means receives the delayed pixel video data and the pixel video data and controllably switches to the raster output scanner either the delayed pixel video data or the pixel video data. Means operably connected to the pixel video data delaying means and the switching means receives the subpixel address data and the pixel video data, programs the delay of the pixel video data delaying means in response to the subpixel address data, and controls the switching means in response to the subpixel address data and the pixel video data.

According to another aspect of the invention, the pixel video data includes a leading edge, and the programming and controlling means programs the delay means for a delay, and controls the switching means such that the video output corresponding to the leading edge of the pixel video data is comprised of the corresponding leading edge of the delayed pixel video data.

According to a final aspect of the invention, the pixel video data includes a trailing edge, and the programming and controlling means programs the delay means for a delay, and controls the switching means such that the video output corresponding to the trailing edge of the pixel video data is comprised of the corresponding trailing edge of the delayed pixel video data.

Other aspects of the invention will become apparent from the following description with reference to the drawings, wherein:

BRIEF DESCRIPTION OF THE DRAWINGS

FIG. 2a is a schematic illustration of a timing diagram displaying the relationship between particular signals within the apparatus of FIG. 1a; and FIG. 2b is a schematic illustration of primitives that would be printed on an image plane under the direction of certain signals depicted in FIG. 2a.

DETAILED DESCRIPTION OF THE PREFERRED EMBODIMENT

Figure 1A:
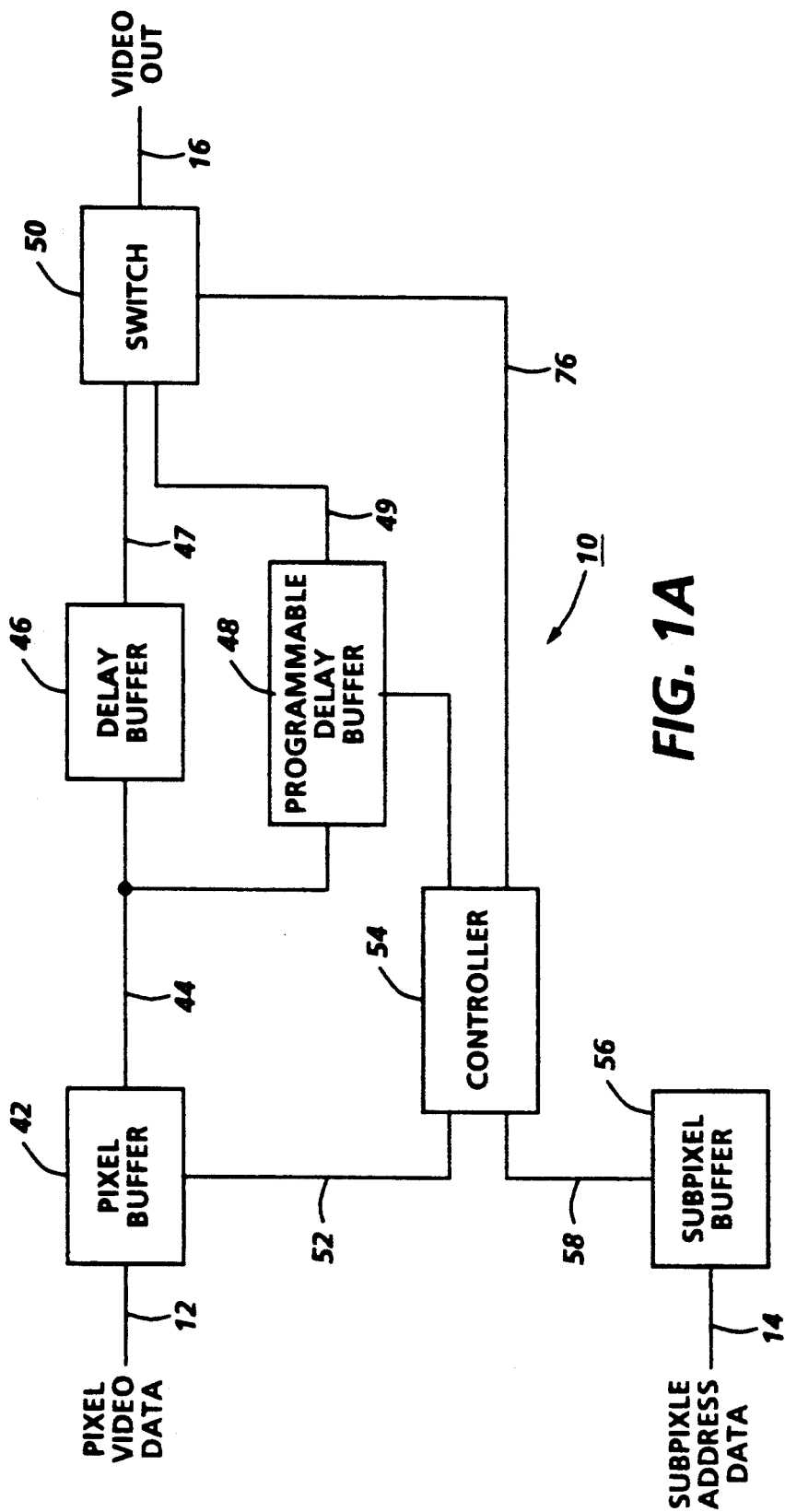
FIG. 1a is a schematic block diagram of an apparatus embodying the present invention.
Figure 1B:
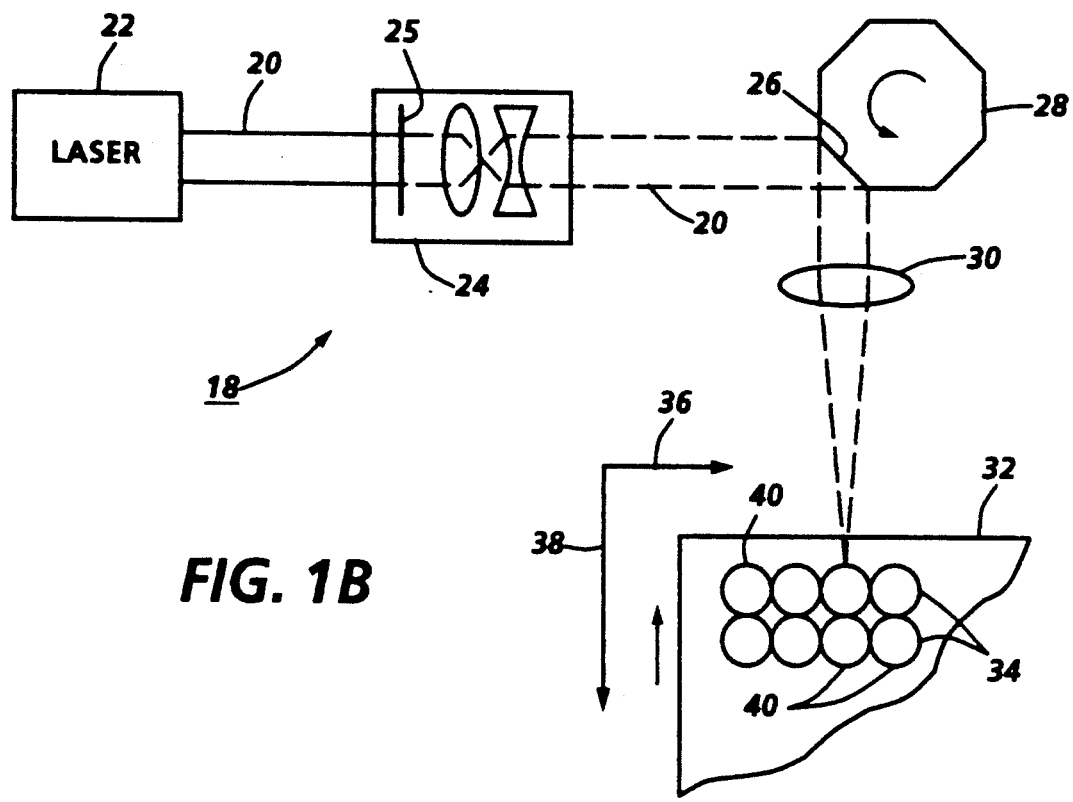
FIG. 1b is schematic block diagram of a Raster Output Scanner (ROS) illustrating a portion of a photosensitive image plane.
Figure 1C:
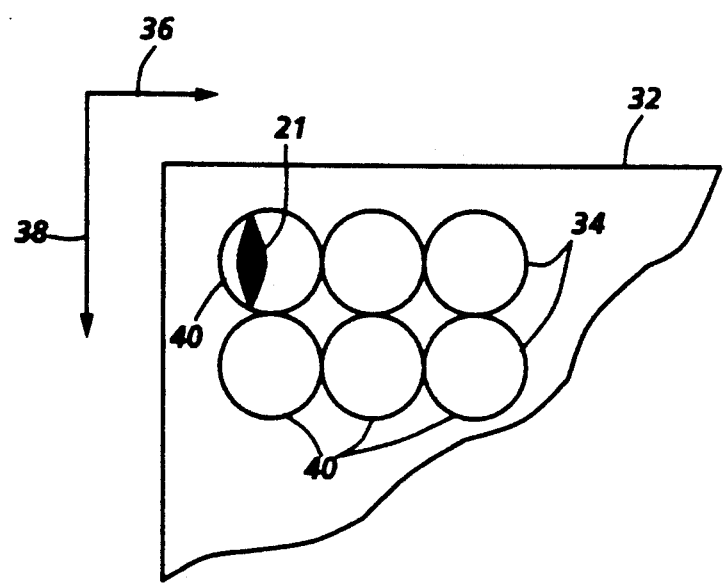
FIG. 1c is a schematic illustration of a portion of an image plane.

Referring now to FIGS. 1a, 1b and 1c, there is shown in FIG. 1a a raster output scanner interface 10 embodying the present invention. Briefly, interface 10 receives as inputs from an Electronic Subsystem (ESS) (not shown) pixel video data 12 and subpixel address data 14, and in response sends video data 16 to a raster output scanner (ROS) 18, shown in FIG. 1b. There are two common types of ROS 18, flying spot and pulse imaging ROSs 18, and interface 10 works with both types of ROS 18. For both types of ROS 18, the laser beam 20 of laser 22, such as a helium-neon laser, passes into conditioning optics 24, which include a modulator 25. For periods of time controlled by video data 16, the modulator 25 either blocks (or deflects) laser beam 20, or allows laser beam 20 to pass through optics 24 to illuminate a facet 26 of rotating polygon 28.

Alternatively, laser 22 could be a laser diode, in which case video data 16 would modulate laser 22, rather than modulator 25, eliminating the need for modulator 25. Also, more than one laser beam 20 could be employed.

After reflecting off of a facet 26, laser beam 20 passes through conditioning optics 30 and forms a spot 21, shown in FIG. 1c, on photosensitive image plane 32. The rotating facet 26 causes laser spot 21 to scan across image plane 32 in a line 34. Line 34 lies in what is called the fast scan direction 36. As facet 26 rotates, image plane 32 moves in the slow scan direction 38 (i.e., the direction substantially perpendicular to the fast scan direction 36) such that successive rotating facets 26 form successive scan lines 34 that are offset from each other in the slow scan direction 38.

Each scan line 34 consists of a row of pixels 40: As laser spot 21 scans across each scan line 34, video data 16 modulates the laser beam 20 such that laser spot 21 addresses successive pixels 40, and either illuminates or does not illuminate the pixels 40. In format, video data 16 is serial and binary, with one bit representing each pixel 40 (e.g., a logic one specifies a pixel 40 to be illuminated, and a logic zero specifies no illumination for the pixel 40).

For both types of ROS 18, the width of a pixel 40 depends on the period or duration of the corresponding bit of video data 16. In a scanning spot ROS 18, at the leading edge of a bit of video data 16, modulator 25 passes laser beam 20 onto the portion of image plane 32 addressed by that particular bit of video data 16. For the time period of the bit, an oval shaped laser spot 21 is scanned across the image plane 32, illuminating the addressed pixel 40. The width of the pixel 40 illuminated thus depends on the period of the bit of video data 16, as well as on the width and the scanning rate of the laser spot 21. Typically the laser spot is two to three times taller than it is wide, with the height of spot 21 being the height of the pixel 40. For example, a pixel 40 for a 600 spi, 135 ppm, dual laser beam 20 printer is about 43 micrometers tall and 20 micrometers wide, and the time period required for the spot 21 to scan across the width of a single pixel 40 is 15 nanoseconds.

In a pulse imaging ROS 18, the bit of video data 16 causes modulator 25, an acoustic device such as a tellurium oxide crystal, to pulse laser beam 20 onto all or part of the addressed portion of image plane 32. The frequency of the pulses of laser beam 20 is dependent on the duration or period of the bit of video data 16. The cumulative effect on image plane 32 of the incident pulses of laser beam 20 is an illuminated pixel 40 having a width that depends on the period of the bit of video data 16.

Video data 16 is clocked so that the period of each bit of video data 16 is the same, 15 nanoseconds, thereby achieving pixels 40 of uniform width. Video data 16 is also synchronized with ROS 18 and the movement of image plane 32 so that a particular bit of video data 16 addresses the appropriate portion of image plane 32, and so that successive scan lines 34 are spaced a uniform amount, with adjacent lines 34 spaced the amount required to provide uniform pixel spacing 40 between adjacent scan lines 34. The synchronization of video data 16, ROS 18 and image plane 32 is achieved by using a system clock (not shown) that has a clock rate of at least the same frequency as the video data 16.

In accordance with the invention, interface 10 includes pixel buffer 42, subpixel buffer 56, controller 54, delay buffer 46, programmable delay buffer 48 controlled by controller 54, and a programmable switch 50 that is controlled by controller 54 and that has as an output video out 16. Pixel video data 12 consists of synchronous, serial data suitable for operating the modulator 25 of conditioning optics 24 to either scan laser spot 21 across the full width of pixels 40, in the case of a scanning spot ROS 18, or to image laser spot 21 the appropriate number of times, in the case of a pulse imaging ROS 18. Subpixel address data 14 consists of synchronous parallel data that describes whether an imaged pixel 40 should remain as described by pixel video data 12, or whether the pixel 40 should have its imaged portion modified (i.e., truncated or extended) to achieve addressibility on a subpixel level.

Pixel video data 12 is clocked to address and image a new pixel 40 every 15 nanoseconds. Like video data 16, in format pixel video data 12 is serial and binary, with one bit of data per pixel 40, and with each bit having a period, T, of 15 nanoseconds. Logic ones signify pixels 40 to be imaged, and logic zeros signifying blank pixels 40 (i.e., pixels 40 not to be illuminated by laser spot 21). Subpixel address data 14 consists of a synchronous, N bit parallel data stream, with one N bit word describing each bit of pixel video data 12. Each N bit descriptor of subpixel address data 14 designates for one pixel 40 one of several possible predetermined choices for the portion of pixel 40 actually illuminated. The number of choices available is a function of word size (i.e., an N bit word gives two to the N-th power of predetermined choices). One choice is to illuminate the full width of the pixel 40 (i.e., leave pixel 40 unchanged). The remaining choices describe modifications that allow subpixel addressing. One type of modification truncates the leading edge of a pixel 40 that forms the leading edge of a primative (not shown). The other type of modification extends the trailing edge of a pixel 40 that forms the trailing edge of a primative (not shown). The option to truncate or extend an edge of a pixel 40 effectively increases the addressability of pixels 40 from only addressing whole pixels 40 to addressing fractions of pixels 40 (i.e., subpixel addressing).

In interface 10, pixel video data 12 passes through pixel buffer 42, while the corresponding subpixel address data 14 passes through subpixel buffer 56. Pixel buffer 42 is a clocked serial FIFO register. Pixel buffer 42 is M bits deep so that a bit of data entering buffer 42 exits after M periods periods T. Similarly, subpixel buffer 56 is an M bit deep clocked serial FIFO register. Buffer 56 is also N bits wide to accommodate the N bit word size of subpixel address data 14. Pixel buffer 42 and subpixel buffer 56 include respective parallel outputs 52 and 58 that address each bit position in buffers 42 and 56 and convey the contents over respective M and 2*N bit parallel busses 52 and 58 to controller 54. The purpose of buffers 42 and 46 is to provide controller 54 with the pixel and subpixel video data 12 and 14 describing a particular pixel 40 M pixel periods T before the pixel video data 12 is received by programmable data buffer 48. Advanced receipt of data 12 and 14 allows controller 54 time to determine how to switch switch 50 and to decode subpixel address data 14 to determine what delay, if any, to program into buffer 48. Preferably, buffers 42 and 56 are four bits wide to provide controller 54 with data 12 and 14 three pixel periods T in advance. If needed, wider or narrower buffers 42 and 56 could be employed.

Pixel buffer 42 also includes serial FIFO output 44 that connects as an input to delay buffers 46 and 48, which have respective serial outputs 47 and 49 that connect as inputs to switch 50. Buffer 46 delays the pixel video data 12 a relatively slight, fixed, amount (i.e., one-twentieth of a pixel period T) in order to prevent a race condition. Buffer 48 delays the pixel video data 12, relative to the delay of buffer 46, a selected amount. For example, assuming a 2-bit wide word for subpixel address data 14 (i.e., N=2) and monotonic, uniform, increments of fractional pixel width, the selectable delay for buffer 48 could be either zero, one-fourth T, one-half T, or three-fourths T.

Switch 50 is operated by controller 54 such that each bit of the video data 16 can be a composite waveform that is partially provided by buffer output 47 and partially provided by buffer output 49. In particular, pixel 40 is truncated by operating switch 50 so that the leading edge of a bit of video data 16 is composed of the leading edge of a bit from the programmable delay buffer output 49. Of course, for the bit of pixel video data 12 under consideration to have a leading edge, the preceding bit of pixel video data 12 must be a logic zero. Similarly, pixel 40 is extended by operating switch 50 so that the trailing edge of a bit of video data 16 is composed of the trailing edge of a bit from the programmable delay buffer output 49. Of course for the bit under consideration to have a trailing edge, the succeeding bit of pixel video data 12 must be a logic zero. To avoid transients in video out 16, controller 54 only causes switch 50 to switch when buffer outputs 47 and 49 exhibit the same logic state, either a logic one or a logic zero.

Figure 2A:
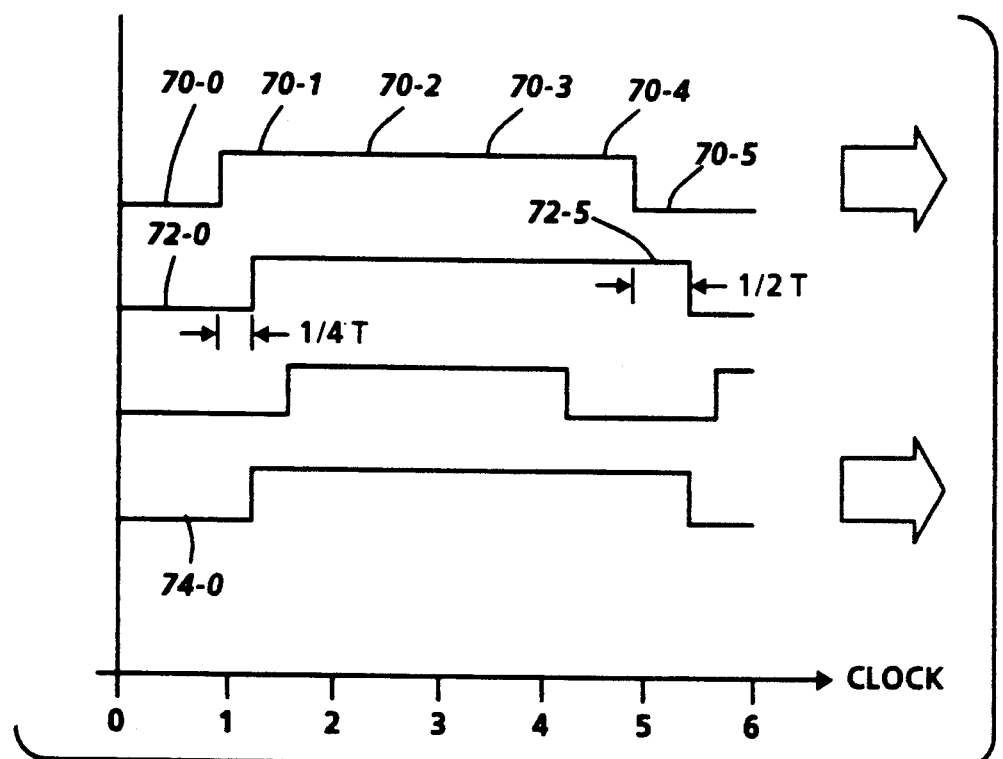
Figure 2B:
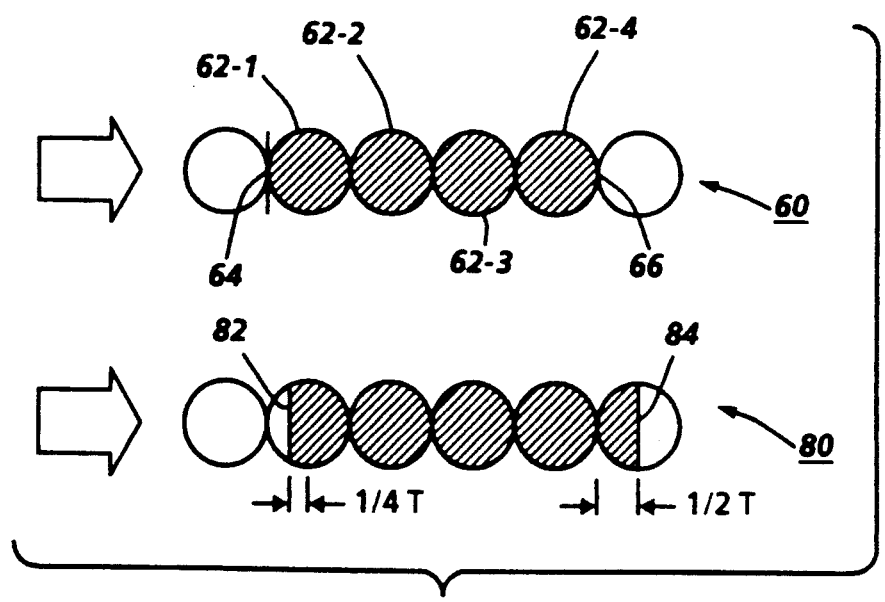

How interface 10 truncates or extends pixels 40 can better be understood by reference to examples. Referring now to FIGS. 1a, 2a and 2b, there is shown in FIG. 2a the timing diagram illustrating how interface 10 can truncate and extend a line primitive 60, shown in FIG. 2b. In FIGS. 2a and 2b, the delay buffer output 47 is shown to describe a line primitive 60 having a length of four pixels 62 in fast scan direction 36. It is desired to truncate the leading edge 64 of the first pixel 62-1 of primitive 60 by one-fourth a pixel period, T, and extend the trailing edge 66 of the last pixel 62-4 by one-half T. The timing diagram of FIG. 2a displays sequences of six bits of data 70, 72 and 74 for respective buffer outputs 47 and 49, and video out 16, which are the four bits that describe primitive 60 and, to show leading and trailing edges 64 and 66, respectively, the bit preceding and following those four bits. Also displayed is the logic level of controller signal 76 that controls switch 50. For controller signal 76, a logic one (i.e., high state) causes switch 50 to switch buffer output 47 through to video out 16, while a logic zero (i.e., low state) switches buffer output 49 through to video out 16.

The truncation of the leading edge 64 of primitive 60 is accomplished in the following manner: In pixel period cycle 0, the bits 70-0 and 72-0 of respective delay buffer outputs 47 and 49 are logic zero, controller signal 76 is zero, and hence video out bit 74-0 is zero. At the start of pixel period 1, delay buffer 49 has been programmed for a one-quarter T, so delay buffer bit 70-1 goes high but delay buffer bit 72-1 stays low until one-quarter T later, when bit 72-1 goes high. When bit 72-1 goes high, bit 74-1 of video out 16 also goes high, in accordance with the low state of controller line signal 76. The results can be seen in FIG. 2b, in which modified primitive 80 now includes a leading edge 82 that is truncated by one-fourth T compared to primitive 60.

The extension of the trailing edge 66 of primitive 60 is accomplished in the following manner: Before the end of pixel period 1, controller signal 76 goes high, causing switch 50 to switch from buffer output 49 to buffer output 47 while both buffer outputs 47 and 49 share the same logic one state. Thereafter, controller 54 resets delay buffer 48 to prepare for the next bit of data while buffer 48 is not providing the data for video out 16 and before the next pixel period. The next two pixel periods do not require any shaping of bits. At the beginning of pixel period 3, controller 54 has programmed buffer 48 for a delay of one-half T. At some point before the end of pixel period 3, control signal 76 causes switch 50 to connect buffer output 49 through to video out 16 avoiding the transients in video out 16 that might occur were switching performed with buffer outputs 47 and 49 at differing logic levels). Consequently, although bit 70-5 of buffer output 47 goes low at the start of pixel period 5, video out bit 70-5 does not go low until one-half clock cycle later, when buffer bit 72-5 goes low. The results can be seen in FIG. 2b, in which modified primitive 80 now includes a trailing edge 84 that is extended by one-half T compared to primitive 60.

As previously mentioned, the number of predetermined choices available for the illuminated width of a pixel 40 can be increased by increasing the word size of subpixel 40. (An N-bit word and associated bus allows two to the N-th power of choices.) In practice, the number of choices is limited by uncertainties that accompany any operation of apparatus 10 at any rate greater than the 15 nanosecond period T of pixels 40, since pixel and subpixel video data 12 an 14, and ROS 18 are only synchronized on a pixel-by-pixel basis.

The main cause of uncertainty is propagation delays inherent in the components in the data paths. Typical propagation delays are about one to two nanoseconds per logic gate, and logic gates are found in delay buffers 42, 46, 48 and 56, as well as in the logic (not shown) within controller 54. The affect of the propagation delays is to delay signal 49, the output of buffer 48, a constant amount, thereby affecting the leading and trailing edges of video out 16. (What the constant amount is depends on the particular means employed to implement controller 54, and buffers 42, 56, 46, and 48.)

The delay caused by propagation delays, however, remains the same for a given interface 10, thereby preserving the repeatability of the image across the image plane 32.

In summary, the present invention is directed to a raster output scanner interface apparatus 10 for receiving subpixel address data 14 and pixel video data 12 that are synchronized with a raster output scanner (ROS) 18 on a pixel 40 basis, and for sending video output 16 to the ROS 18 that is synchronized with the ROS 18 on a pixel 40 basis. The apparatus 10 includes means for receiving the pixel video data and delaying the pixel video data a programmable amount, such as pixel buffer 48. Means, such as switch 50, operably connected to the pixel video data delaying means receives the delayed pixel video data and the pixel video data 12 and controllably switches to the ROS 18 either the delayed pixel video data or the pixel video data 12. Means, such as controller 54, operably connected to the pixel video data delaying means and the switching means receives the subpixel address data 14 and the pixel video data 12, programs the delay of the pixel video data delaying means in response to the subpixel address data 14, and controls the switching means in response to the subpixel address data 14 and the pixel video data 12. In a preferred embodiment, the pixel video data 12 includes a leading edge, and the programming and controlling means controls the switching means such that the video output corresponding to the leading edge of the pixel video data is comprised of the corresponding leading edge of the delayed pixel video data. In addition, the pixel video data 12 includes a trailing edge, and the programming and controlling means controls the switching means such that the video output corresponding to the trailing edge of the pixel video data 12 is comprised of the corresponding trailing edge of the delayed pixel video data.

While the invention has been described with reference to the structures disclosed, it is not confined to the specific details set forth, but is intended to cover such modifications or changes as may come within the scope of the claims.

What is claimed is:

1. A raster output scanner interface apparatus for receiving subpixel address data and pixel video data that are synchronized with a raster output scanner on a pixel basis, and for sending video output to the raster output scanner that is synchronized on a pixel basis, the apparatus comprising:

delaying means for receiving the pixel video data and delaying the pixel video data a programmable amount;

switching means operably connected to said delaying means for receiving the delayed pixel video data and the pixel video data and for controllably switching to the raster output scanner either the delayed pixel video data or the pixel video data;

the pixel video data having a data describing leading edge; and means operably connected to said delaying means and said switching means for receiving the subpixel address data and the pixel video data, for programming the delay of the pixel video data delaying means in response to the subpixel address data, and for controlling the switching means in response to the subpixel address data and the pixel video data such that the video output corresponding to the leading edge of the pixel video data is comprised of the corresponding leading edge of the delayed pixel video data.

2. A raster output scanner interface apparatus for receiving subpixel address data and pixel video data that are synchronized with a raster output scanner on a pixel basis, and for sending video output to the raster output scanner that is synchronized on a pixel basis, the apparatus comprising:

delaying means for receiving the pixel video data and delaying the pixel video data a programmable amount;

switching means operably connected to said delaying means for receiving the delayed pixel video data and the pixel video data and for controllably switching to the raster output scanner either the delayed pixel video data or the pixel video data;

the pixel video data having a data describing trailing edge; and means operably connected to said delaying means and said switching means for receiving the subpixel address data and the pixel video data, for programming the delay of the pixel video data delaying means in response to the subpixel address data, and for controlling the switching means in response to the subpixel address data and the pixel video data such that the video output corresponding to the trailing edge of the pixel video data is comprised of the corresponding trailing edge of the delayed pixel video data.

3. A raster output scanner interface apparatus for receiving subpixel address data and pixel video data that are synchronized with a raster output scanner on a pixel basis, and for sending video output to the raster output scanner that is synchronized on a pixel basis, the apparatus comprising:

delaying means for receiving the pixel video data and delaying the pixel video data a programmable amount;

switching means operably connected to said delaying means for receiving the delayed pixel video data and the pixel video data and for controllably switching to the raster output scanner either the delayed pixel video data or the pixel video data;

means operably connected to said delaying means and said switching means for receiving the subpixel address data and the pixel video data, for programming the delay of the pixel video data delaying means in response to the subpixel address data, and for controlling the switching means in response to the subpixel address data and the pixel video data;

said delaying means including means for programming discrete, monotonically increasing delays.

4. A raster output scanner interface apparatus for receiving subpixel address data and pixel video data that are synchronized with a raster output scanner on a pixel basis, and for sending video output to the raster output scanner that is synchronized on a pixel basis, the apparatus comprising:

delaying means for receiving the pixel video data and delaying the pixel video data a programmable amount;

switching means operably connected to said delaying means for receiving the delayed pixel video data and the pixel video data and for controllably switching to the raster output scanner either the delayed pixel video data or the pixel video data;

the pixel video data having a data describing leading edge and a data describing trailing edge; and means operably connected to said delaying means and said switching means for receiving the subpixel address data and the pixel video data, for programming the delay of the pixel video data delaying means in response to the subpixel address data, and for controlling the switching means in response to the subpixel address data and the pixel video data such that the video output corresponding to the leading edge of the pixel video data is comprised of the corresponding leading edge of the delayed pixel video data and the video output corresponding to the trailing edge of the pixel video data is comprised of the corresponding trailing edge of the delayed pixel video data.

* * * * *